(12) United States Patent
Baek et al.

(10) Patent No.: US 10,670,342 B2
(45) Date of Patent: Jun. 2, 2020

(54) COLD RESERVING HEAT EXCHANGER

(71) Applicant: Hanon Systems, Daejeon (KR)

(72) Inventors: Seung Su Baek, Daejeon (KR); Young-Ha Jeon, Daejeon (KR); Sun Mi Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 172 days.

(21) Appl. No.: 15/896,746

(22) Filed: Feb. 14, 2018

(65) Prior Publication Data

US 2018/0292136 A1 Oct. 11, 2018

(30) Foreign Application Priority Data

Apr. 10, 2017 (KR) .................. 10-2017-0045808
May 31, 2017 (KR) .................. 10-2017-0067459
Jun. 5, 2017 (KR) .................. 10-2017-0069492

(51) Int. Cl.
| | |
|---|---|
| *F28D 1/03* | (2006.01) |
| *F28F 9/02* | (2006.01) |
| *F28D 1/053* | (2006.01) |
| *F28F 1/02* | (2006.01) |
| *F28D 20/02* | (2006.01) |
| *F28F 3/12* | (2006.01) |
| *F28D 21/00* | (2006.01) |
| *F28D 20/00* | (2006.01) |

(52) U.S. Cl.
CPC .............. *F28D 1/03* (2013.01); *F28D 1/0333* (2013.01); *F28D 1/05391* (2013.01); *F28D 20/02* (2013.01); *F28F 1/022* (2013.01); *F28F 3/12* (2013.01); *F28F 9/0207* (2013.01); *F28F 9/0217* (2013.01); *F28D 2020/0013* (2013.01); *F28D 2021/0085* (2013.01); *Y02E 60/142* (2013.01); *Y02E 60/145* (2013.01)

(58) Field of Classification Search
CPC ........ F28D 1/03; F28D 1/05391; F28D 20/02; F28D 2020/0013; F28D 2021/0085; F28F 1/022; F28F 3/12; F28F 9/0207; F28F 9/0217

See application file for complete search history.

(56) References Cited

FOREIGN PATENT DOCUMENTS

JP 2000-205777 A 7/2000

*Primary Examiner* — Jon T. Schermerhorn, Jr.
(74) *Attorney, Agent, or Firm* — Norton Rose Fulbright US LLP; James Crawford

(57) ABSTRACT

The present invention relates to a cold reserving heat exchanger, and more particularly; to a cold reserving heat exchanger capable of improving cooling comfortableness of a user and minimizing energy and a time consumed at the time of again performing cooling by storing a cold reserving material in a second-row tube among tubes disposed in three rows in a width direction and allowing a cooling fluid moving in a first-row tube and a third-row tube among the tubes to be movable between the first-row tube and the third-row tube to effectively store cold air of the cooling fluid and discharge the cold air at the time of stopping an engine to thus prevent a rapid rise in an internal temperature of a vehicle.

20 Claims, 14 Drawing Sheets

| HYDRAULIC DIAMETER | 0.6 | 0.7 | 1.38 | 1.5 | 2.5 | 3.1 |
|---|---|---|---|---|---|---|
| Q | 86% | 89% | 100% | 100% | 92% | 87% |

COLD RESERVING HEAT EXCHANGER

CROSS-REFERENCE TO RELATED APPLICATIONS

This application claims priority under 35 U.S.C. § 119to Korean Patent Application No. 10-2017-0045808, filed on Apr. 10, 2017, Korean Patent Application No. 10-2017-0067459, filed on May 31, 2017, and Korean Patent Application No. 10-2017-0069492, filed on Jun. 5, 2017, in the Korean Intellectual Property Office, the disclosure of which is incorporated herein by reference in its entirety.

TECHNICAL FIELD

The following disclosure relates to a cold reserving heat exchanger, and more particularly, to a cold reserving heat exchanger capable of improving cooling comfortableness of a user and minimizing energy and a time consumed at the time of again performing cooling by storing a cold reserving material in a second-row tube among tubes disposed in three rows in a width direction and allowing a cooling fluid moving in a first-row tube and a third-row tube among the tubes to be movable between the first-row tube and the third-row tube to effectively store cold air of the cooling fluid and discharge the cold air at the time of stopping an engine to thus prevent a rapid rise in an internal temperature of a vehicle.

BACKGROUND

Recently, in accordance with an increase in an interest in an environment and energy in an automobile industry around the world, a study for improving fuel efficiency has been conducted, and research and development for weight reduction, miniaturization and function improvement have been continuously conducted in order to satisfy various needs of consumers.

In many cases, a hybrid vehicle adopts an idle stop and go (ISG) system automatically stopping an engine at the time of being stopped, for example, at the time of waiting for light to be changed, or the like, and restarting the engine by a manipulation of a transmission. However, even in the case of the hybrid vehicle, a cooling apparatus is operated by the engine. Therefore, in the case in which the engine is stopped, a compressor is also stopped, such that a temperature of an evaporator rises to deteriorate comfortableness of a user. In addition, since a refrigerant in the evaporator is easily vaporized even at room temperature, the refrigerant is vaporized for a short time in which the compressor is not operated, such that the vaporized refrigerant should be compressed and liquefied even though the engine is again operated, such that the compressor and the evaporator are operated. Therefore, it takes a long time for cold air to be supplied, to the interior, and an entire required energy amount is increased.

Here, the hybrid vehicle may further include a cold reserving evaporator to improve cooling performance and extend or delay an engine restart time.

As the related art, Japanese Patent Application Laid-Open Publication No. 2000-205777 (entitled "Cold Reserving Heat Exchanger") has been suggested, which is illustrated in FIG. 1.

In a cold reserving heat exchanger 90 as illustrated in FIG. 1, a refrigerant path 91e through which a refrigerant flows and cold reserving material chambers 91f and 91f in which a cold reserving material is stored are formed integrally with each other by a tube 91 having a dual-pipe structure, and a path 94 of a fluid heat-exchanged with the refrigerant is formed outside the tube 91 having the dual-pipe structure.

However, in the cold reserving heat exchanger as illustrated in FIG. 1, the tube is formed by bonding several plates to each other, such that an occurrence frequency of a bonding defect is high, the tube is formed in the dual pipe structure, such that it is difficult to manufacture the tube, and in the case in which the bonding defect occurs, the refrigerant and the cold reserving material may be mixed with each other. In addition, even though the bonding defect occurs, it is difficult to find a portion in which the bonding defect occurs.

In order to solve the problem as described above, a cold reserving heat exchanger including a plurality of tubes disposed in three rows in a width direction and including a first-row tube and a third-row tube in which a cooling fluid is circulated and a second-row tube in which a cold reserving material is stored; and an upper header tank and a lower header tank fixed to both ends of the tubes in a length direction, including a first space portion that is in communication with the first-row tube, a second space portion that is in communication with the second-row tube, and a third space portion that is in communication with the third-row tube, which correspond to three spaces separated in the width direction, and having a header and a tank coupled to each other, as illustrated in FIG. 2A, has been developed.

The cold reserving heat exchanger requires an additional structure in order to move a refrigerant between a first row and a third row, and in an exemplary embodiment of FIGS. 2A and 2B, a refrigerant moving path portion 13 for moving the refrigerant between the first row and the third row is further included at one end portion of a lower tank 12.

In this case, in the cold reserving heat exchanger, partition walls partitioning the fluid, between first to third rows occupy the respective volumes, such that a width of an evaporator is increased, and a length of the cold reserving heat exchanger is increased due to the refrigerant moving path port ion.

In addition, a mounted space of the cold reserving heat exchanger is limited, and particularly, spaces of the upper header tank and the lower header tank are also limited. In the case of prioritizing heat radiation performance as compared with cold reserving performance in the cold reserving heat exchanger, spaces of the first space portion and the third space portion should be increased in order to improve the heat radiation performance, and in the case of prioritizing the cold reserving performance, a size of the second space portion in which cold air may be stored should be increased. Therefore, there is a limitation in uniformly increasing ail the spaces.

In addition, it is difficult to optimize a design so as to improve both of the heat radiation performance and the cold reserving performance.

Further, referring to cross sections of tubes of FIG. 2B illustrating a cross section taken along line A-A' of FIG. 2A, in the cold reserving heat exchanger, all of the tubes of the first to third rows have the same shape. It is difficult to change shapes and structures of the tubes, for example, to increase cross-sectional areas of the tubes of the first to third rows in order to improve the heat radiation performance in the case of prioritizing the heat radiation performance of the cold reserving heat exchanger as compared with the cold reserving performance or in order to increase a size of the tube of the second row in the case of prioritizing the cold reserving performance.

Therefore, it is necessary to develop a cold reserving heat exchanger of which an increase in a volume is minimized in a more compact structure.

In addition, it is necessary to develop a cold reserving heat exchanger of which both of heat radiation performance and cold reserving performance may be improved by optimizing areas of first to third space portions in a header tank of the cold reserving heat exchanger.

Further, it is necessary to develop a cold reserving heat exchanger of which both of heat radiation performance and cold reserving performance may be improved by changing shapes and structures of tubes of first to third rows of the cold reserving heat exchanger.

RELATED ART DOCUMENT

Patent Document

Japanese Patent Application Laid-Open Publication No. 2000-205777 (entitled "Cold Reserving Heat Exchanger")

SUMMARY

An embodiment of the present invention is directed to providing a cold reserving heat exchanger capable of improving cooling comfortableness of a user and minimizing energy and a time consumed at the time of again performing cooling by storing a cold reserving material in a second-row tube among tubes disposed in three rows in a width direction and allowing a cooling fluid moving in a first-row tube and a third-row tube among the tubes to be movable between the first-row tube and the third-row tube to effectively store cold air of the cooling fluid and discharge the cold air at the time of stopping an engine to thus prevent a rapid rise in an internal temperature of a vehicle.

Another embodiment of the present invention is directed to providing a cold reserving heat exchanger of which both of heat radiation performance and cold reserving performance may be improved by optimizing areas of first to third space portions in a header tank of the cold reserving heat exchanger.

Still another embodiment of the present invention is directed to providing a cold reserving heat exchanger of which both of heat radiation performance and cold reserving performance may be improved, by optimizing shapes and structures of tubes of first to third rows of the cold reserving heat exchanger.

In one general aspect, a cold reserving heat exchanger includes: a plurality of tubes 100 disposed in three rows in a width direction and including a first-row tube 110 and a third-row tube 130 in which a cooling fluid is circulated and a second-row tube 120 in which a cold reserving material is stored; an upper header tank 201 and a lower header tank 202 fixed to both ends of the tubes 100 in a length direction, including a first space portion 231 that is in communication with the first-row tube 110, a second space portion 232 that is in communication with the second-row tube 120, and a third space portion 233 that is in communication with the third-row tube 130, corresponding to three spaces separated in the width direction, and having a header 210 and a tank 220 coupled to each other; a partition wall portion 300 provided in each of the upper header tank 201 and the lower header tank 202 to separate a space and including two header-side partition wail portions 310 surrounding the second-row tube 120 and extended toward the tank and a tank-side partition wall portion 320 extended from a predetermined point at which the header-side partition wall portions 310 meet each other in the same direction and having the other end fixed to any one point of the tank 220; and an inlet 410 formed in the first space portion 231 or the third space portion 233 and having the cooling fluid introduced therethrough and an outlet 420 formed in the first space portion 231 or the third space portion 233 and having the cooling fluid discharged therethrough.

The header-side partition wall portions 310 may have one ends each fixed between a second-row tube insertion hole 212 and a first-row tube insertion hole 211 of the header 210 and between the second-row tube insertion hole 212 and a third-row tube insertion hole 213 of the header 210.

The cold reserving heat exchanger 1 may be formed so that intervals between the first-row to third-row tube insertion holes 211 to 213 and thicknesses of the header-side partition wall portions 310 are the same as each other.

The partition wall portion 300 may include communication holes 340 formed by hollowing predetermined regions on the tank-side partition wall portion 320 so that the cooling fluid moves between the first space portion 231 and the third space portion 233.

The communication holes 340 may be formed in at least any one place of the partition wall portion 300 provided in the upper header tank 201 or the lower header tank 202.

A plurality of communication holes 340 may be formed to be spaced apart from each other by a predetermined interval in the length direction of the partition wall portion 300.

The partition wall portion 300 may include a plurality of header coupling protrusions formed at one end portions of the header-side partition wall portions 310, protruding toward the header 210, and spaced apart from each other by a predetermined interval in the length direction.

The upper header tank 201 and the lower header tank 202 may include first seating grooves 331 formed by concaving an inner side surface of the header 210 so that end portions of the header-side partition wall portions 310 are seated at predetermined positions.

The upper header tank 201 and the lower header tank 202 may include a second, seating groove 332 formed by concaving an inner side surface of the tank 220 so that an end portion of the tank-side partition, wall portion 320 is seated at a predetermined position.

The two header-side partition wall portions 310 of the partition wall portion 300 may be bent at an end portion of the second-row tube 120, and be linearly extended toward any one point at which the tank-side partition wall portion 320 is formed while having a predetermined gradient.

The two header-side partition wall portions 310 of the partition wall portion 300 may be curved in a round shape at an end portion of the second-row tube 120, and be linearly extended toward any one point at which the tank-side partition wall portion 320 is formed.

The two header-side partition wall portions 310 of the partition wall portion 300 may be bent at an end portion of the second-row tube 120, and be extended, in a horizontal direction, toward any one point at which the tank-side partition wall portion 320 is formed.

The cold reserving heat exchanger 1 may further include baffles 360 disposed in the first space portion 231 and the third space portion 233 in order to adjust movement of the cooling fluid.

In the cold reserving heat exchanger 1, the tubes 100 disposed in the three rows may be simultaneously extruded and formed integrally with each other or be separately extruded and formed.

The cola reserving heat exchanger 1 may further include fins 500 interposed between the tubes 100 of the respective rows, wherein the fins 500 interposed between the tubes 100 disposed in the three rows are formed integrally with each other.

The second-row tube 120 may toe inserted into the header 210 by a predetermined length, and the two header-side partition wall portions 310 may be bent at an end portion of the second-row tube 120 and meet one end of the tank-side partition wall portion 320 having a predetermined length from the tank 220 toward the header 210.

Areas of the first space portion 231, the second space portion 232, and the third space portion 233 may be determined by a tube insertion length A by which the second-row tube 120 is inserted into the header 210, a length B of the tank-side partition wall portion 320, and widths C of the first-row tube 110 and the third-row tube 130.

The first-row tube 110 and the second-row tube 120 may have the same shape.

A ratio of an area occupied by the first space portion 231 and the third space portion 233 to an entire cross-sectional area of the upper header tank 201 or the lower header tank 202 may be 0.75 to 0.88.

A ratio of the tube insertion length A to a height of the upper header tank 201 or the lower header tank 202 may be 0.38 to 0.51, a ratio of the length B of the tank-side partition wall portion 320 to the height, of the upper header tank 201 or the lower header tank 202 may be 0.45 to 0.57, and a ratio of each of the widths C of the first-row tube 110 and the third-row tube 130 to a width of the upper header tank 201 or the lower header tank 202 may be 0.25 to 0.33.

Widths of the first-row tube 110 and the third-row tube 130 may be larger than that of the second-row tube 120, and the first-row tube 110 and the third-row tube 130 may include one or more tube partition walls 111 and 131 formed in the length direction, respectively.

Each of the number of tube partition walls in the first-row tube 110 and the number of tube partition walls in the third-row tube 130 may be the same as or larger than that of tube partition walls in the second-row tube 120.

The number of tube partition walls in the second-row tube 120 may be 4 or less.

Each of a hydraulic diameter of the first-row tube 110 and a hydraulic diameter of the third-row tube 130 may be smaller than that of the second-row tube 120.

Each of a hydraulic diameter of the first-row tube 110 and a hydraulic diameter of the third-row tube 130 may be 0.75 mm to 2.6 mm.

Each of a hydraulic diameter of the first-row tube 110 and a hydraulic diameter of the third-row tube 130 may be 1.0 mm to 2.2 mm.

Each of a thickness T1 of an external wall of the first-row tube 110 and a thickness T3 of an external wall of the third-row tube 130 may be the same as or larger than a thickness T2 of an external wall of the second-row tube 120.

The cold reserving heat exchanger may further include: a first connecting portion 140 connecting the first-row tube 110 and the second-row tube 120 disposed on the same line to each other; and a second connecting portion 150 connecting the second-row tube 120 and the third-row tube 130 disposed on the same line to each other.

The first-row tube 110, the second-row tube 120, and the third-row tube 130 may be simultaneously extruded and be formed integrally with each other.

The first-row tube 110, the second-row tube 120, and the third-row tube 130 may be separately extruded and be formed.

[Detailed Description of Main Elements]

Figure 1:
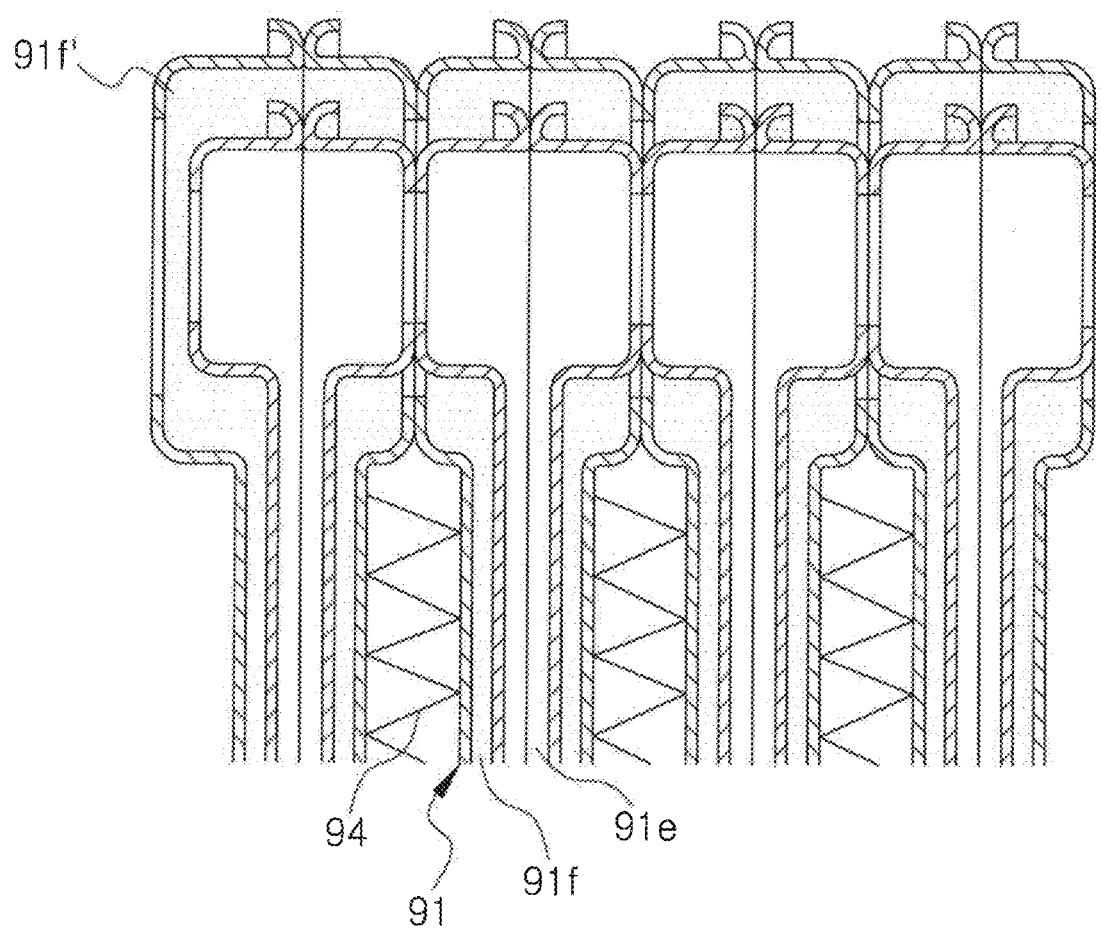
FIG. 1 is a cross-sectional view illustrating a cold reserving heat exchanger having a dual pipe form according to the related art.
Figure 2A:
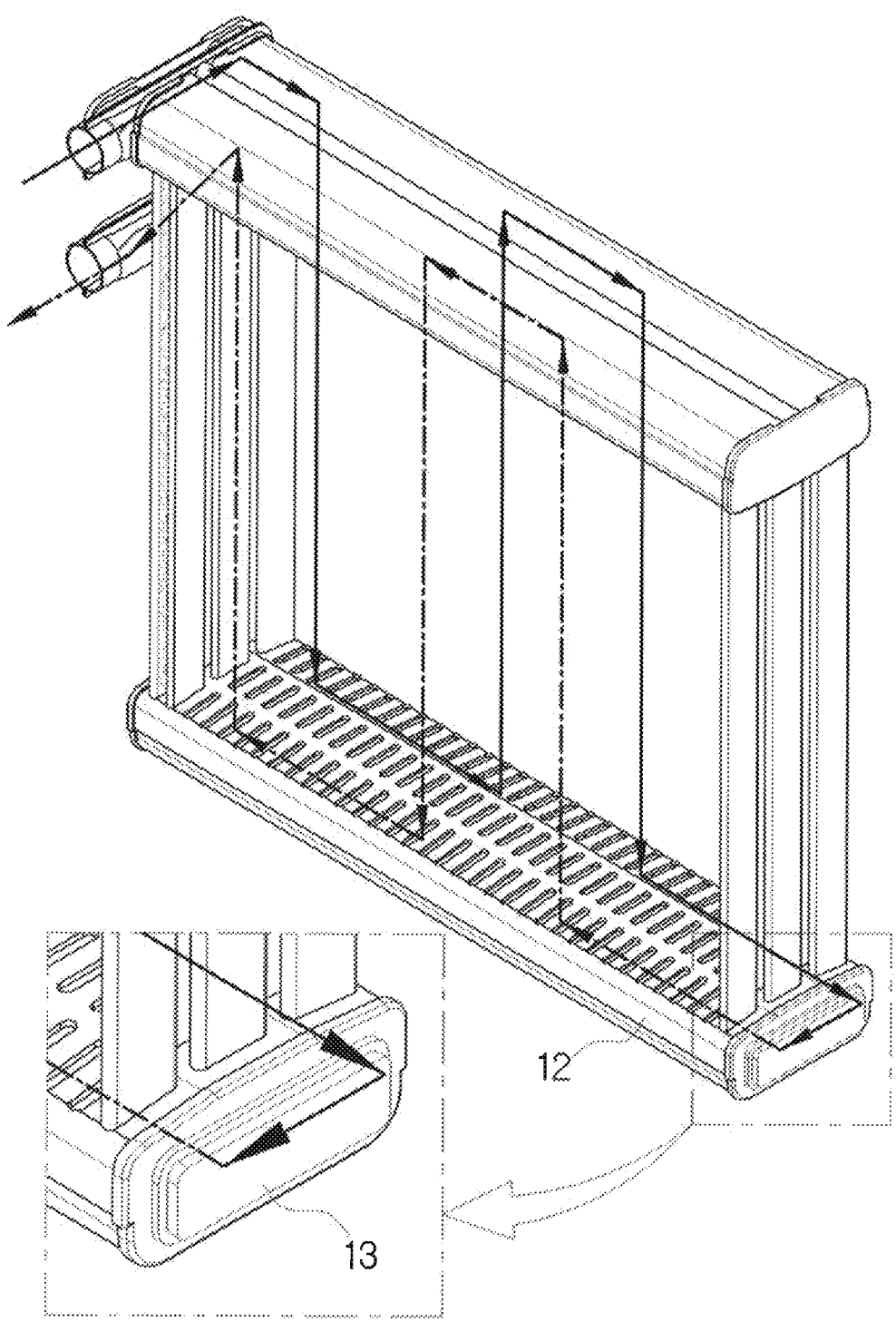
FIG. 2A is a perspective view illustrating a three-row cold reserving heat exchanger according to the related art.
Figure 2B:
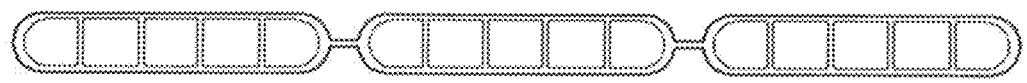
FIG. 2B is a cross-sectional view of tubes of the cold reserving heat exchanger according to the related art taken along line A-A of FIG. 2A.

1: cold reserving heat exchanger
100: tube
110, 120, 130: first-row tube to third-row tube
111, 121, 131: tube partition wall
140, 150: first connecting portion, second connecting portion
201, 202: upper header tank, lower header tank
210: header
211, 212, 213: first-row tube insertion hole to third-row tube insertion hole
214: protrusion insertion groove
220: tank
231, 232, 233: first space portion, second space portion, third space portion
300: partition wall portion
310: header-side partition wall portion
320: tank-side partition wall portion
331: first seating groove
332: second seating groove
340: communication hole
360: baffle
410, 420: inlet, outlet
430: manifold
440, 450: inlet pipe, output pipe
500: fin

DETAILED DESCRIPTION OF EMBODIMENTS

Hereinafter, a cold reserving heat exchanger according to the present invention will be described in detail with reference to the accompanying drawings.

Figure 3:
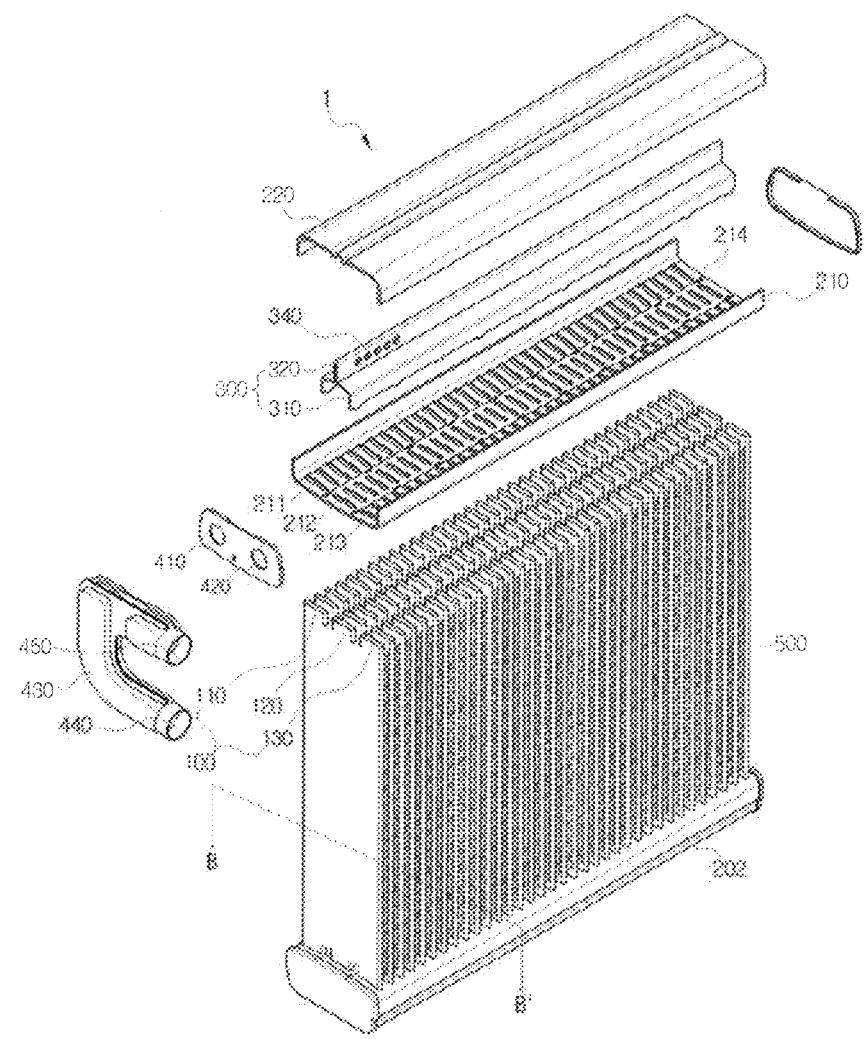
FIGS. 3 and 4 are, respectively, an exploded perspective view and an assembled perspective view of a cold reserving heat exchanger according to the present invention.
Figure 4:
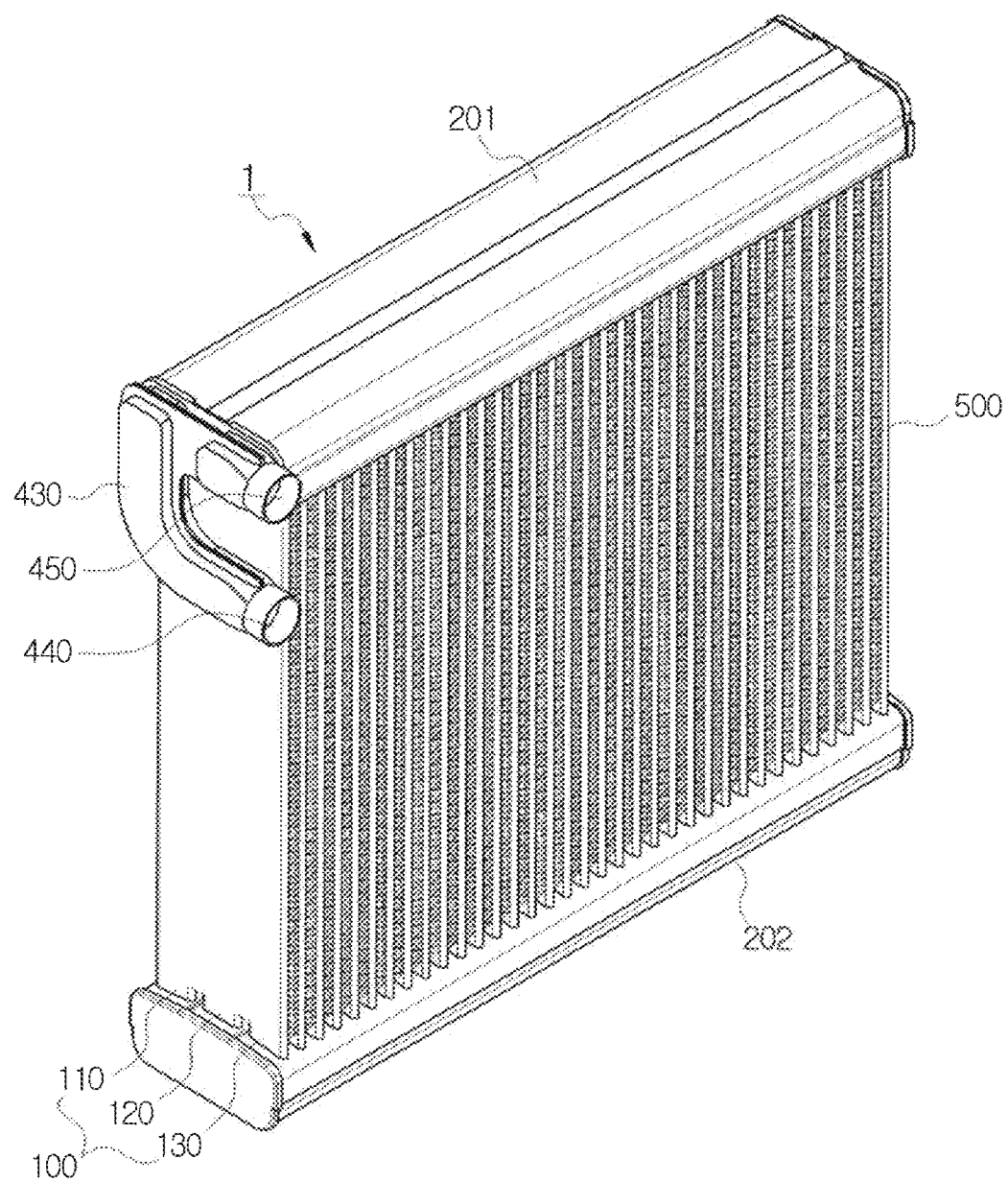

As illustrated in FIGS. 3 and 4, the cold reserving heat exchanger 1 according to the present invention is configured to mainly include tubes 100, an upper header tank 201, a lower header tank 202, a partition wall portion 300, an inlet 410, and an outlet 420.

First, the tubes 100 are disposed in three rows in a width direction, and a cooling fluid is circulated in a first-row tube 110 and a third-row tube 130, and a cold reserving material is stored in a second-row tube 120.

Here, three-row tubes 100 are formed to be connected to each other, such that the tubes 100 may be simultaneously formed integrally with each other by an extruding process. In this case, the tubes may be simply manufactured and be easily assembled.

The cold reserving heat exchanger 1 may further include fins 500 interposed between the tubes 100. The fins 500 interposed between the tubes 100 disposed in the three rows are formed integrally with each other, such that heat exchange between the first-row tube 110 and the third-row tube 130 in which the cooling fluid moves and the second-row tube 120 in which the cold reserving material is stored may be performed through the fins 500.

In addition, in the tubes 100, widths of the first-row tube 110, the second-row tube 120, and the third-row tube 130 may be the same as each other or a width of the second-row tube 120 may be smaller than those of the first-row tube 110 and the third-row tube 130. However, a width of the second-row tube 120 may be larger than those of the first-row tube 110 and the third-row tube 130 so that a cold reserving material storing space in the second-row tube 120 may be sufficiently secured, and the number of partition walls formed in the second-row tube 120 in order to improve a pressure resistance property may be smaller than those of partition walls formed in the first-row tube 110 and the third-row tube 130.

Next, the upper header tank 201 and the lower header tank 202 are fixed to both ends of the tubes 100 in a length direction, each include a first space portion 231 that is in communication with the first-row tube 110, a second space portion 232 that is in communication with the second-row tube 120, and a third space portion 233 that is in communication with the third-row tube 130, which correspond to three spaces separated in the width direction, and are formed by coupling a header 210 and a tank 220 to each other.

The header 210 and the tank 220 are each formed by a press process, and are brazed and bonded to each other to constitute one upper header tank 201 or lower header tank 202.

The partition wall portion 300 is further provided in the upper header tank 201 and the lower header tank 202 in order to separate the first space portion 231, the second space portion 232, and the third space portion 233 from each other.

The partition wall portion 300 may mainly include two header-side partition wall portions 310 and a tank-side partition wall portion 320. The header-side partition wall portions 310 have one ends each fixed between a second-row tube insertion hole 212 and a first-row tube insertion hole 211 of the header 210 and between the second-row tube insertion hole 212 and a third-row tube insertion hole 213 of the header 210, surround the second-row tube 120, and are extended toward the tank 220.

The tank-side partition wall portion 320 is extended from a predetermined point at which the header-side partition wall portions 310 meet each other in the same direction, and has the other end fixed to any one point of the tank 220.

Figure 5:
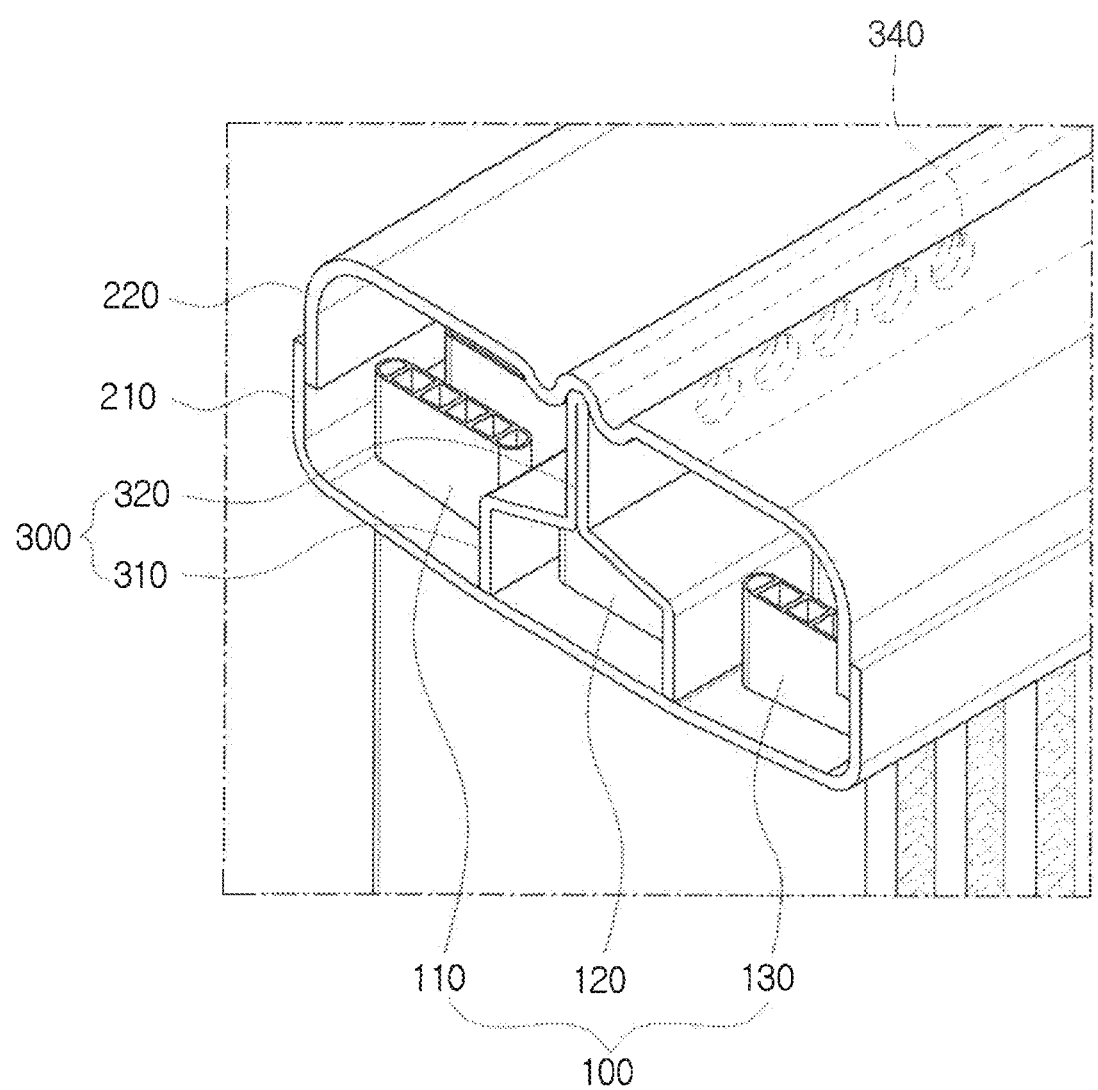
FIGS. 5 and 6 are, respectively, a perspective views and an exploded perspective view illustrating an upper header tank of the cold reserving heat exchanger according to the present invention.
Figure 6:
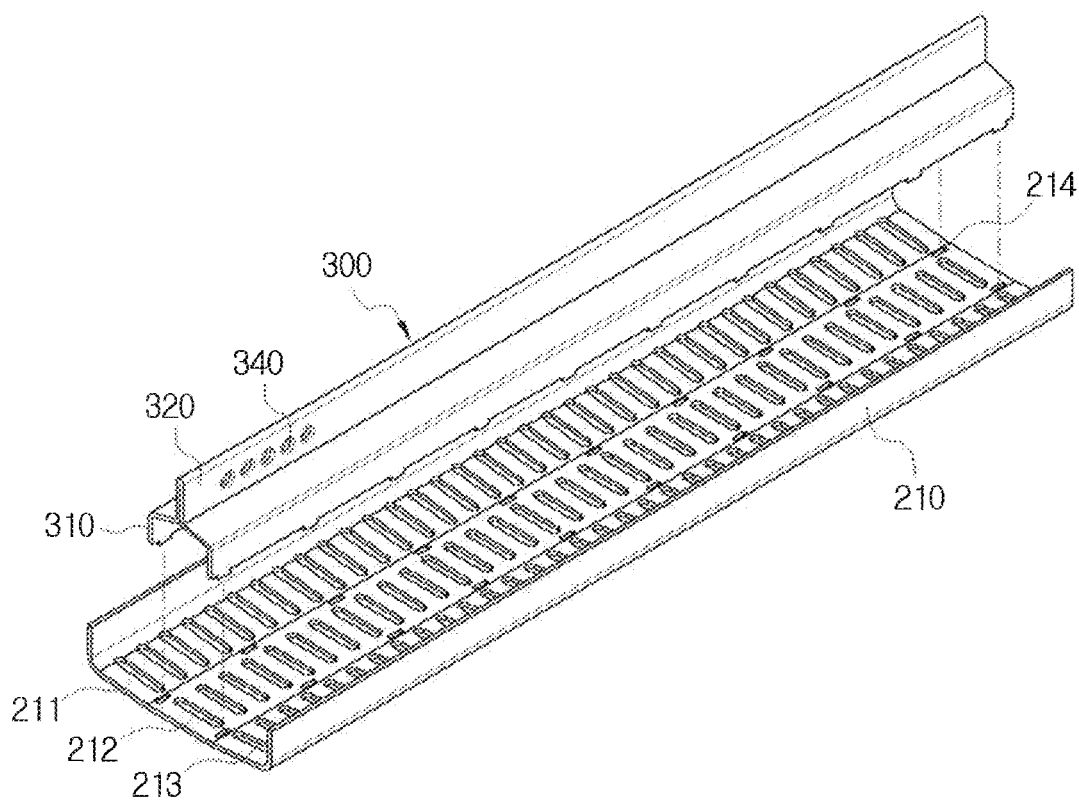

Here, as illustrated in FIGS. 5 and 6, the partition wall portion 300 includes communication holes 340 formed by hollowing predetermined regions on the tank-side partition wall portion 320 so that the cooling fluid may move between the first space port ion 231 and the third space portion 233.

The communication holes 340 are formed in at least any one of partition walls provided in the upper header tank 201 or the lower header tank 202. However, positions of the communication holes 340 may be changed depending on a cooling fluid channel of the cold reserving heat exchanger 1, and the communication holes 340 may also be formed in several partition walls.

Although an example in which a plurality of communication holes 340 are formed to be spaced apart from each other by a predetermined interval in the length direction of the partition wall portion 300 is illustrated in FIGS. 5 and 6, a plurality of communication holes 340 having a small size or one communication hole 340 having a large size may be formed, in consideration of moving resistance of the cooling fluid and a pressure resistance property of the partition wall portion 300.

In an exemplary embodiment illustrated in FIG. 6, the partition wall portion 300 includes a plurality of header coupling protrusions formed at one end portions of the header-side partition wall portions 310, protruding toward the header 210, and spaced apart from each other by a predetermined interval in the length direction.

The header coupling protrusions, which fix the partition wall portion 300 to a predetermined position of the header 210, are inserted and fixed, into protrusion insertion grooves 214 formed on the header 210.

Figure 7:
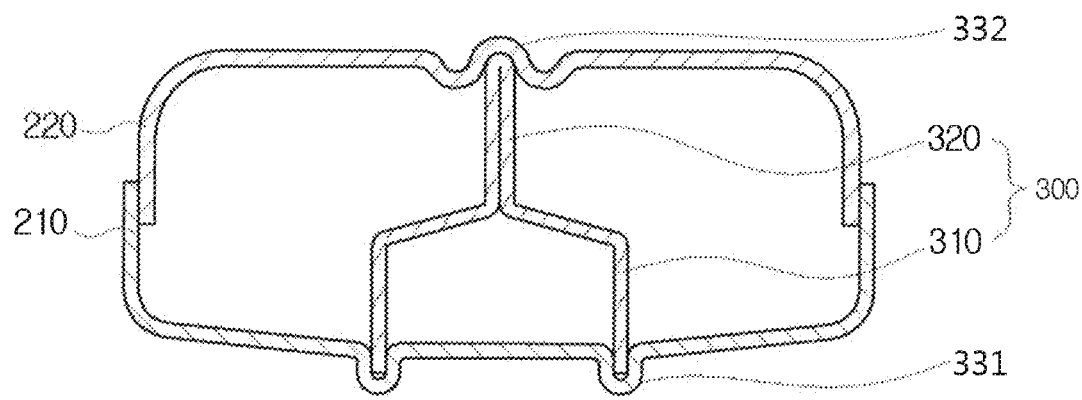
FIG. 7 is a front view illustrating a state in which a partition wall portion is mounted on the upper header tank in the cold reserving heat exchanger according to the present invention.

As another exemplary embodiment, as illustrated in FIG. 7, in order to fix the partition wall portion 300, the upper header tank 201 and the lower header tank 202 may include first seating grooves 331 formed by concaving an inner side surface of the header 210 so that end portions of the header-side partition wall portions 310 are seated at predetermined positions and a second seating groove 332 formed by concaving an inner side surface of the tank 220 so that an end portion of the tank-side partition wall portion 320 is seated at a predetermined position.

In other words, the header-side partition wall portions 310 of the partition wall portion 300 are fixed to two points of the header 210 and the tank-side partition wall portion 320 of the partition wall portion 300 is fixed to one point of the tank 220, and the first seating grooves 331 and the second seating groove 332 are formed by concaving the inner side surfaces of the header and the tank so that the header-side partition wall portions 310 and the tank-side partition wall portion 320 may be seated, at points at which the header-side partition wall portions 310 and the tank-side partition, wall portion 320 are fixed.

Then, the partition wall portion 300 is brazed and coupled together with the header 210 and the tank 220 to close coupled, portions.

As still another exemplary embodiment, the partition wall portion 300 may be seated on the inner side surface of the header 210 and be then brazed and coupled, and fixed to the header 210, without the first seating grooves 331 and the second, seating groove 332 or the penetrated protrusion insertion grooves 214 at the time of being fixed to the header 210 and the tank 220.

Figure 8A:
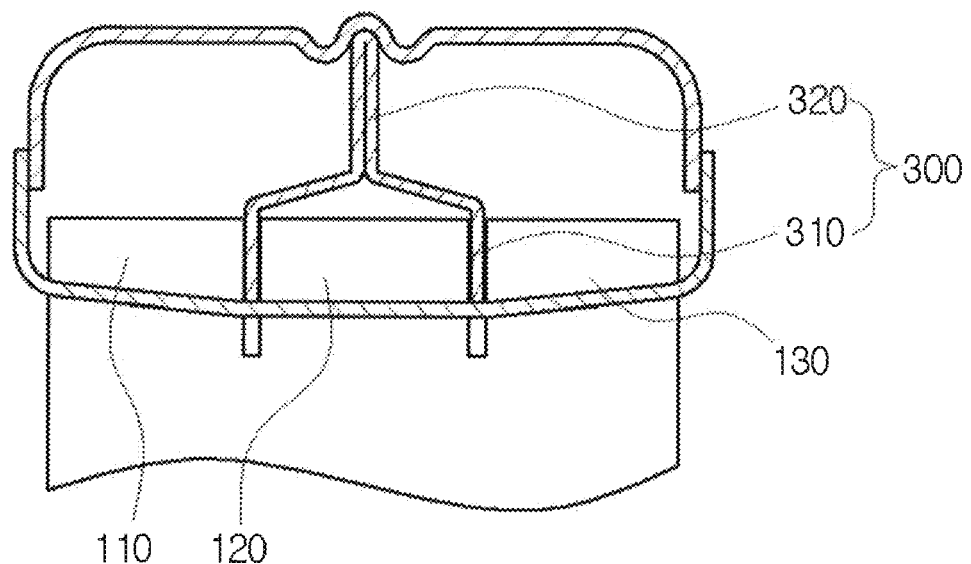
FIGS. 8A to 8C are front views illustrating states in which partition wall portions according to various exemplary embodiments of the present invention are mounted.
Figure 8B:
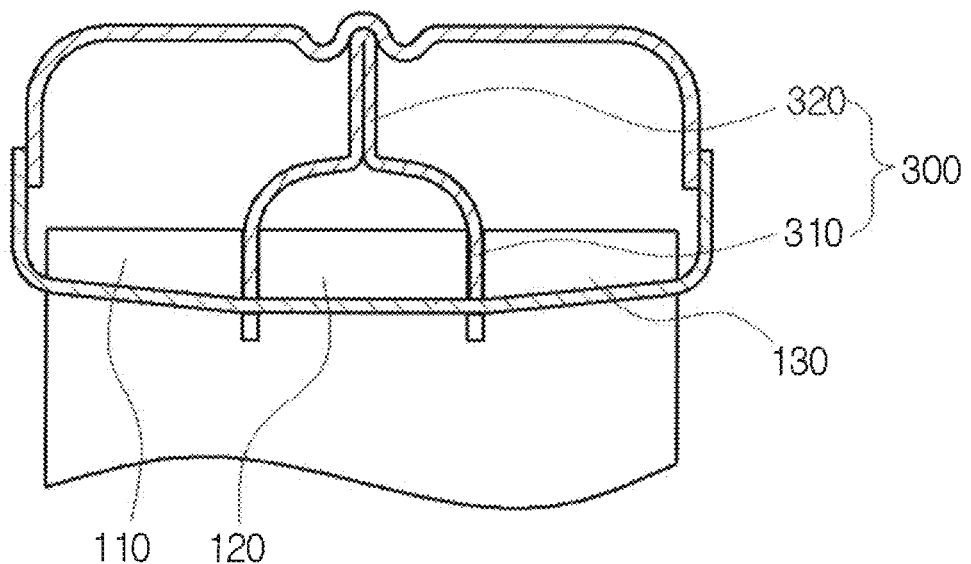
Figure 8C:
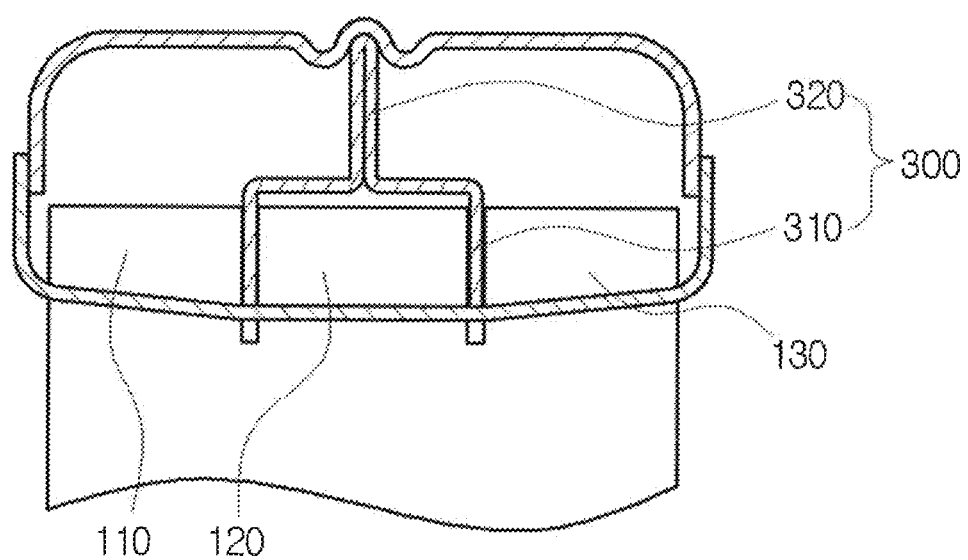

Meanwhile, as illustrated in FIGS. 8A to 8C, a shape of the partition wall, portion 300 may be variously modified as long as the header-side partition wall portions 310 are fixed to the two points of the header 210, the tank-side partition wall portion 320 is fixed to the one point of the tank 220, and the space is separated into the first space portion 231, the second space portion 232, and the third space portion 233.

First, as illustrated in FIG. 8A, the two header-side partition wall portions 310 of the partition wall portion 300 may be bent at an end portion of the second-row tube 120, and may be linearly extended toward, any one point, at which the tank-side partition wall portion 320 is formed while having a predetermined gradient.

As another example, as illustrated in FIG. 8B, the two header-side partition wall portions 310 of the partition wall portion 300 may be curved in a round shape at an end portion of the second-row tube 120, and may be linearly extended toward any one point at which the tank-side partition wall portion 320 is formed.

As still another example, as illustrated in FIG. 8C, the two header-side partition wall portions 310 of the partition wall portion 300 may be bent at an end portion of the second-row tube 120, and may be extended, in a horizontal direction, toward any one point at which the tank-side partition wall portion 320 is formed.

Here, the cold reserving heat exchanger 1 is formed so that intervals between the first-row to third-row tube insertion holes 211 to 213 and thicknesses of the header-side partition wall portions 310 are the same as each other, such that a width of a core of the cold reserving heat exchanger 1 may be minimized.

Meanwhile, the cold reserving heat exchanger 1 may include the inlet 410 formed in the first space portion 231 or the third space portion 233 and having the cooling fluid introduced therethrough and the outlet 420 formed in the first space portion 231 or the third space portion 233 and having the cooling fluid discharged therethrough.

Here, an inlet pipe 440 and an outlet pipe 450 may be connected to the inlet 410 and the outlet 420, respectively, through a manifold 430.

In addition, the cold reserving heat exchanger 1 may further include baffles 360 disposed in the first space portion 231 and the third space portion 233 in order to adjust movement of the cooling fluid, thereby variously changing channels.

In FIGS. 9 to 12, cold reserving heat exchangers 1 in which channels of the cooling fluid are variously configured by changing positions of the communication holes 340 and the baffles 360 are illustrated.

Hereinafter, a flow of the cooling fluid of two paths in the cold reserving heat exchanger 1 will be described with reference to FIG. 9.

Figure 9:
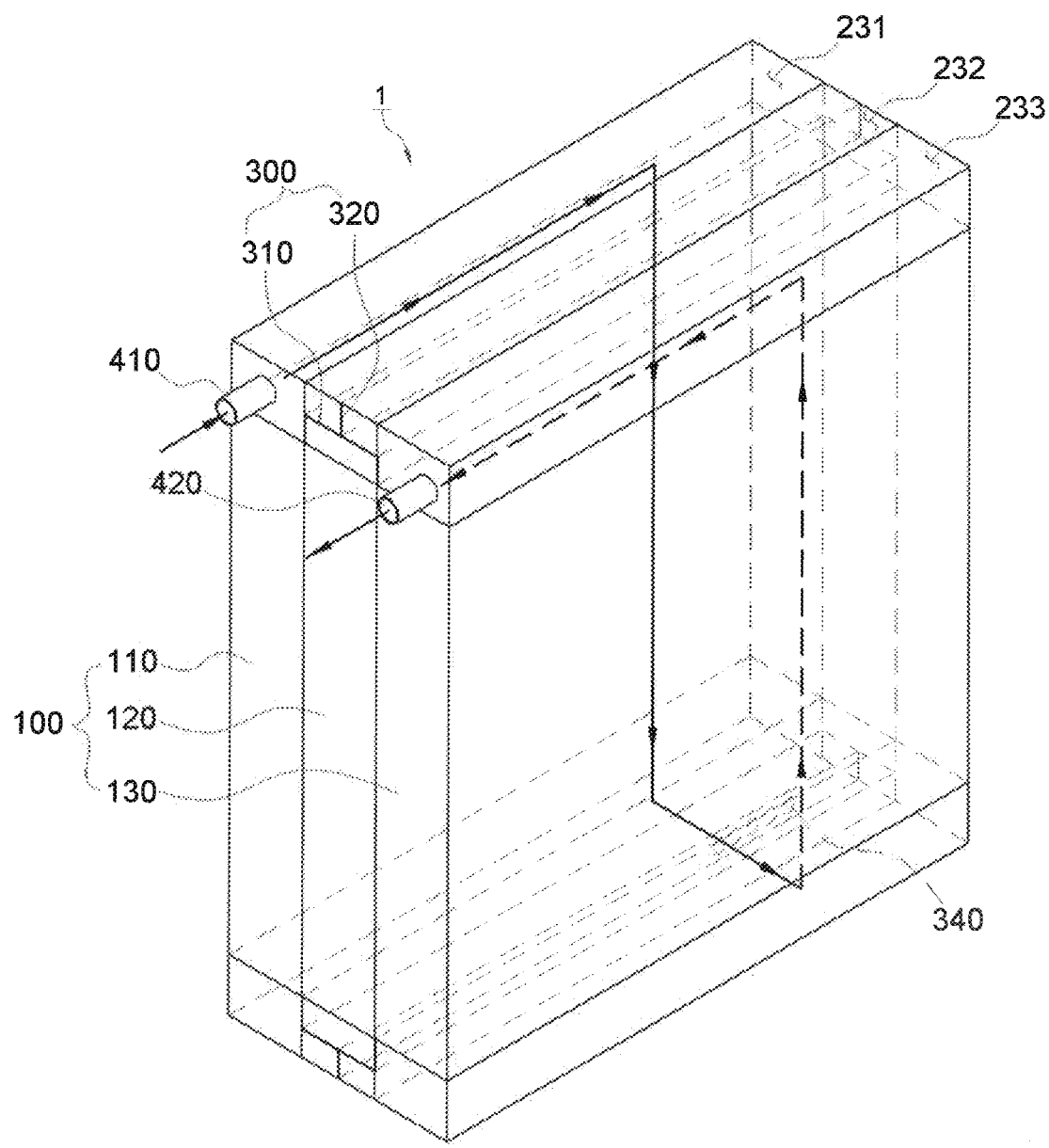
FIGS. 9 to 12 are views illustrating flows of cooling fluids in the cold reserving heat exchanger according to the present invention.

In the cold reserving heat exchanger 1 illustrated in FIG. 9, the inlet 410 and the outlet 420 may be formed in the upper header tank 201, and the communication holes 340 are formed in one of the partition walls included in the lower header tank 202.

First, the cooling fluid is introduced through the inlet 410 formed in the first space portion 231 of the upper header tank 201, moves downwardly along the first-row tube 110, passes through the communication holes 340 formed in the partition wall portion 300 of the lower header tank 202, and is then introduced into the third space portion 233.

Then, the cooling fluid passes through the third space portion 233 of the lower header tank 202, moves upwardly along the third-row tube 130, is introduced into the third space portion 233 of the upper header tank 201, and is then discharged through the outlet 420 formed in the third space portion 233 of the upper header tank 201.

Next, a flow of the cooling fluid of four paths in the cold reserving heat exchanger 1 will be described with reference to FIG. 10.

Figure 10:
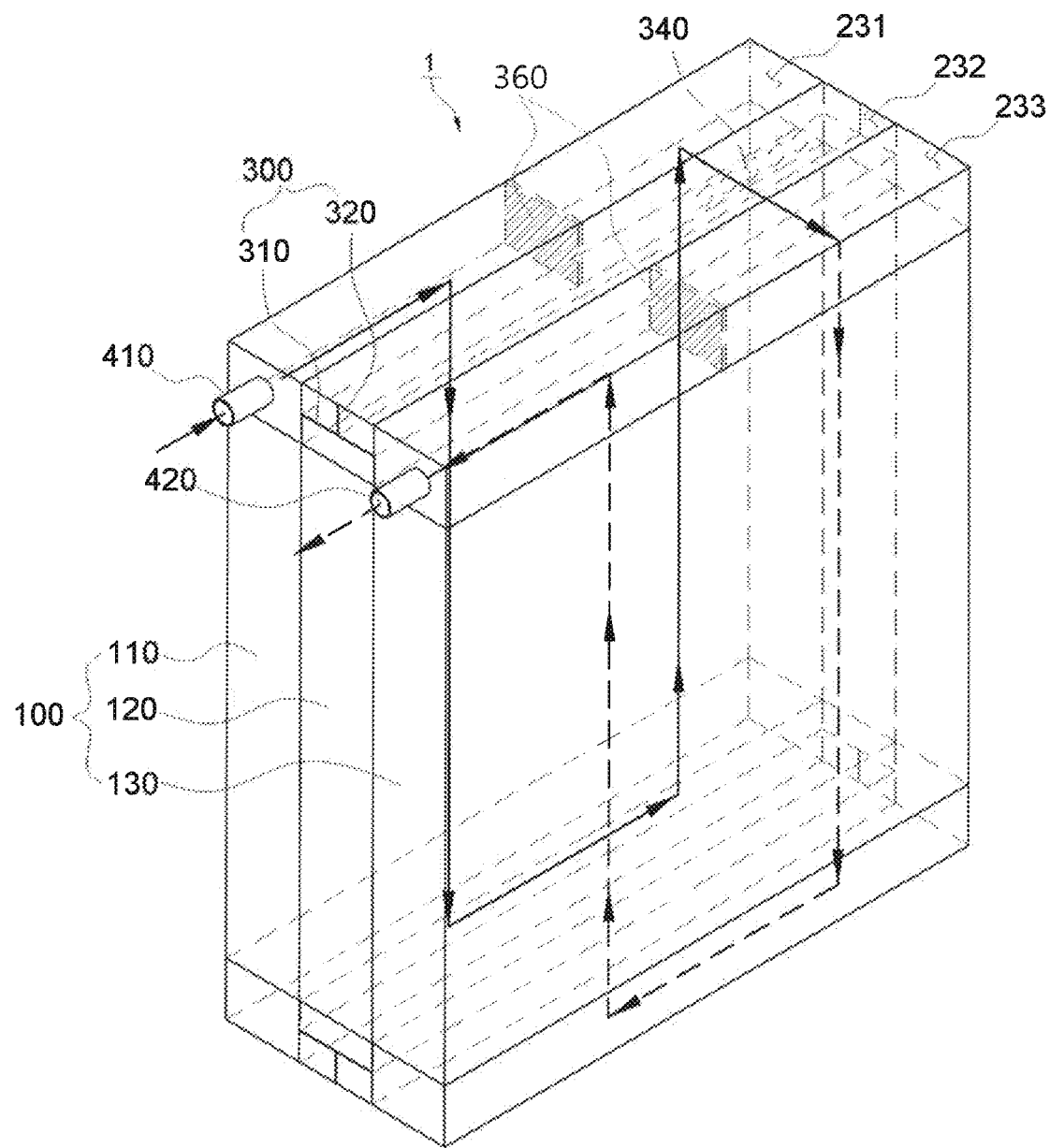

In the cold reserving heat exchanger 1 illustrated in FIG. 10, the inlet 410 and the outlet 420 are formed in the upper header tank 201, the communication holes 340 are formed in one of the partition walls provided in the upper header tank 201, and the baffle 360 is provided in each of the first space portion 231 and the third space portion 233 of the upper header tank 201.

First, the cooling fluid is introduced through the inlet 410 formed in the first space portion 231 of the upper header tank 201, moves in a sequence of downward and upward directions along the first-row tube 110, arrives at the upper header tank 201, passes through the communication holes 340 formed in the partition wall portion 300 of the upper header tank 201, and is then introduced into the third space portion 233.

Then, the cooling fluid moves downwardly along the third-row tube 130 connected to the third space portion 233 of the upper header tank 201, moves along the third space portion 233 of the lower header tank 202, again moves upwardly along the third-row tube 130, finally arrives at the upper header tank 201, and is then discharged through the outlet 420 formed in the third space portion 233 of the upper header tank 201.

Next, a flow of the cooling fluid of six paths in the cold reserving heat exchanger 1 will be described with reference to FIG. 11.

Figure 11:
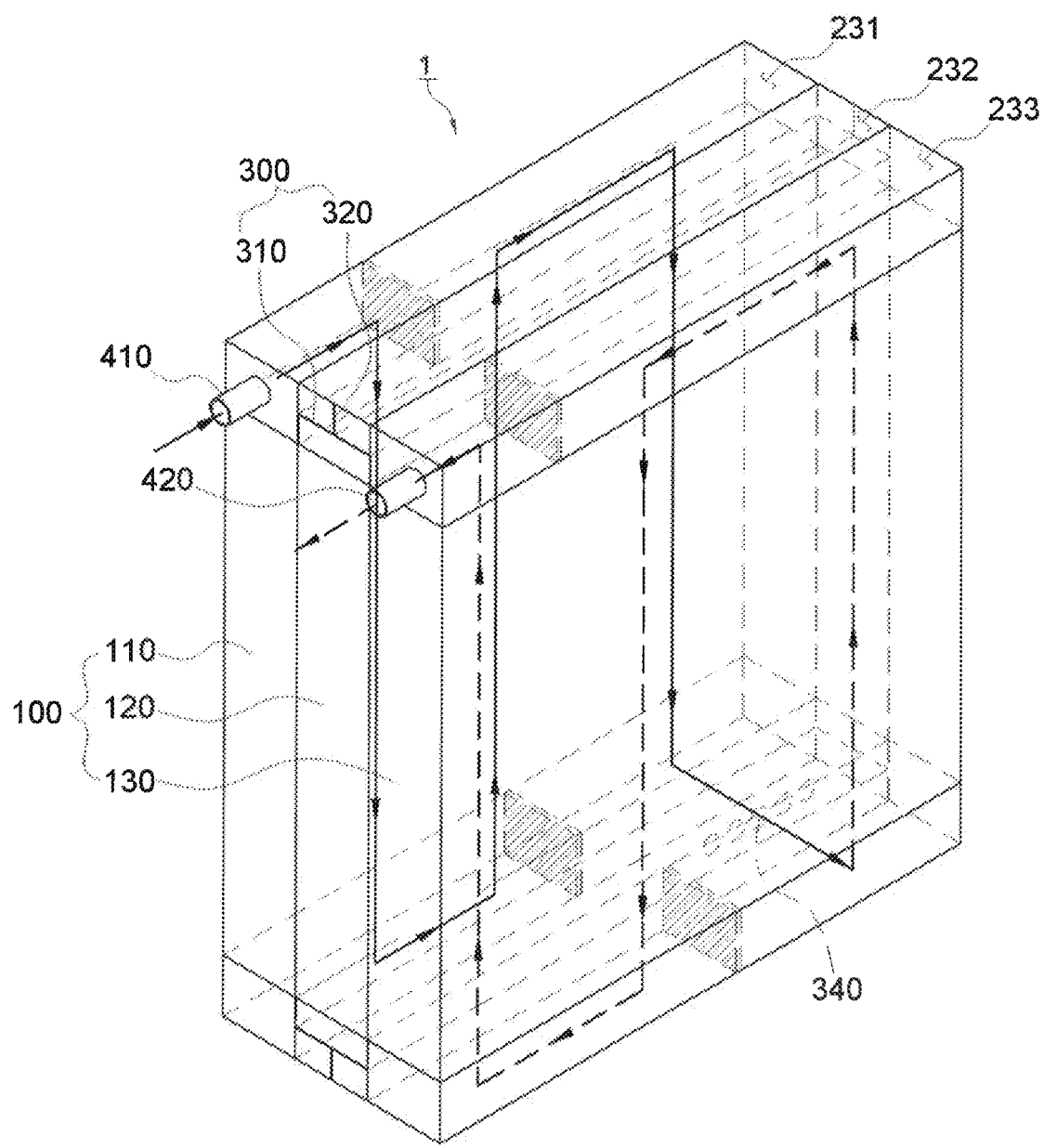

In the cold reserving heat exchanger 1 illustrated in FIG. 11, the inlet 410 and the outlet 420 are formed in the upper header tank 201, the communication holes 340 are formed in one of the partition walls provided in the lower header tank 202, and the baffle 360 is provided in each of the first space portions 231 and the third space portions 233 of the upper header tank 201 and the lower header tank 202.

First, the cooling fluid is introduced through the inlet 410 formed in the first space portion 231 of the upper header tank 201, moves in a sequence of downward, upward, and downward directions along the first-row tube 110, arrives at the lower header tank 202, passes through the communication holes tank 202, and is then introduced into the third space portion 233.

Then, the cooling fluid moves upwardly along the third-row tube 130 connected to the third space portion 233 of the lower header tank 202, moves along the third space portion 233 of the upper header tank 201, again moves in a sequence of downward and upward directions along the third-row tube 130, finally arrives at the upper header tank 201, and is then discharged through the outlet 420 formed in the third space portion 233 of the upper header tank 201.

Figure 12:
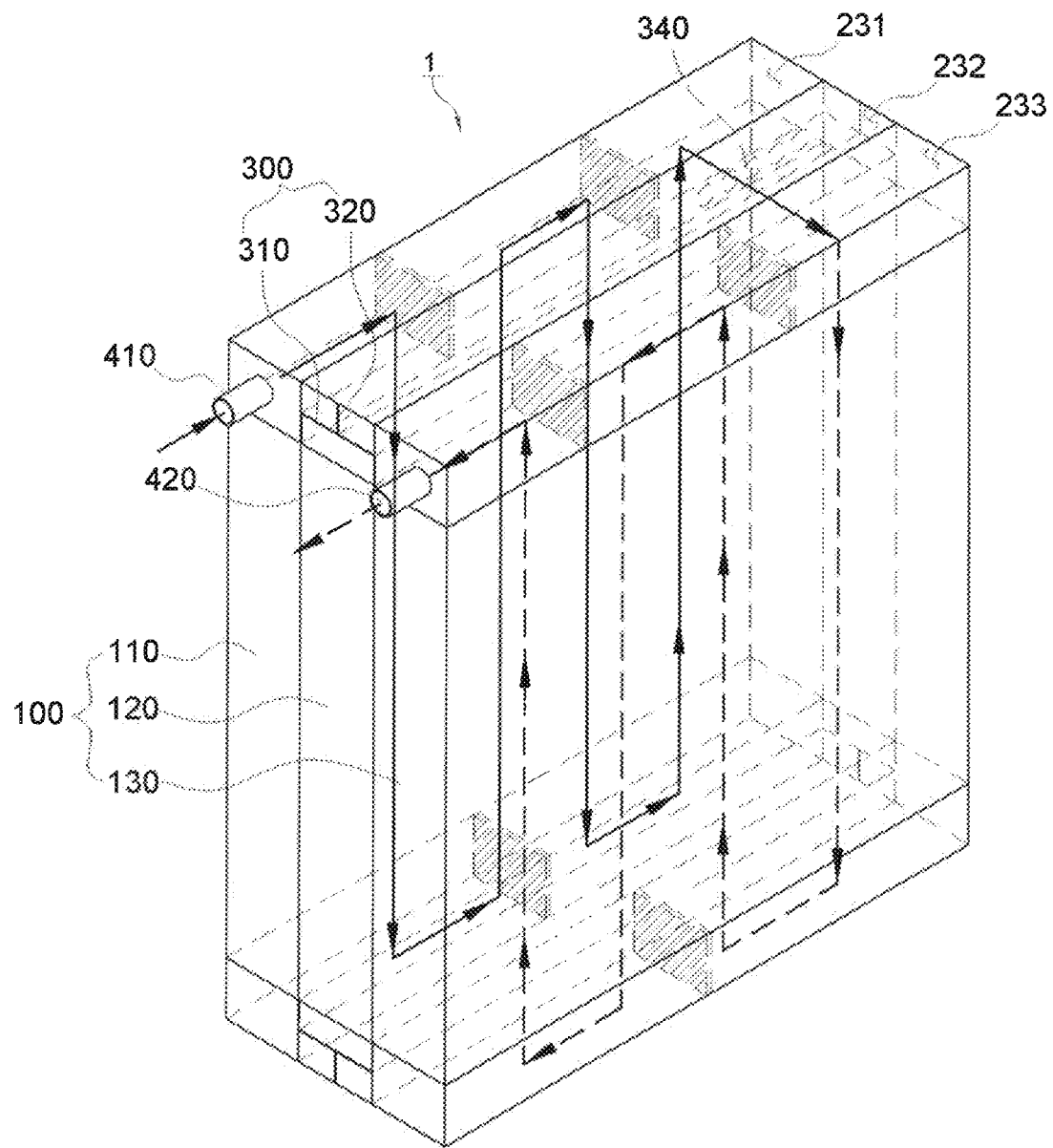

Finally, the cold reserving heat exchanger 1 having a flow of the cooling fluid of eight paths is illustrated in FIG. 12. The flow is similar to that of FIG. 11, but one baffle 360 is further provided in each of the first space portion 231 and the third space portion 233 of the upper header tank 201 in order to further form two paths through which the cooling fluid moves upwardly from the bottom and moves downwardly from the top.

Therefore, in the present invention, the partition wall portion 300 surrounding the second-row tube 120 in which the cold reserving material is stored, separating the first-row tube 110, the third-row tube 130, and the space, and having the communication holes 340 formed therein so that the cooling fluid of the first-row tube 110 and the third-row tube 130 is circulated may be included in the upper and lower header tanks 201 and 202 to prevent the cold reserving material and the cooling fluid from being mixed with each other and remove an area unnecessarily occupied for separating the space, thereby making it possible to minimize the width of the entire core of the cold reserving heat exchanger.

In addition, in the present invention, the partition wall portion 300 allows a moving space of the cooling fluid moving to the first-row tube 110 and the third-row tube 130 in the upper and lower header tanks 201 and 202 to be maximally secured while separating a space of the second-row tube 120, thereby making it possible to minimize moving resistance, and a separate additional structure for moving the cooling fluid between the first-row tube 110 and the third-row tube 130 does not need to be installed, such that a manufacturing cost may be reduced.

Meanwhile, hereinafter, a cold reserving heat exchanger according to another exemplary embodiment of the present invention will be described.

Figure 13:
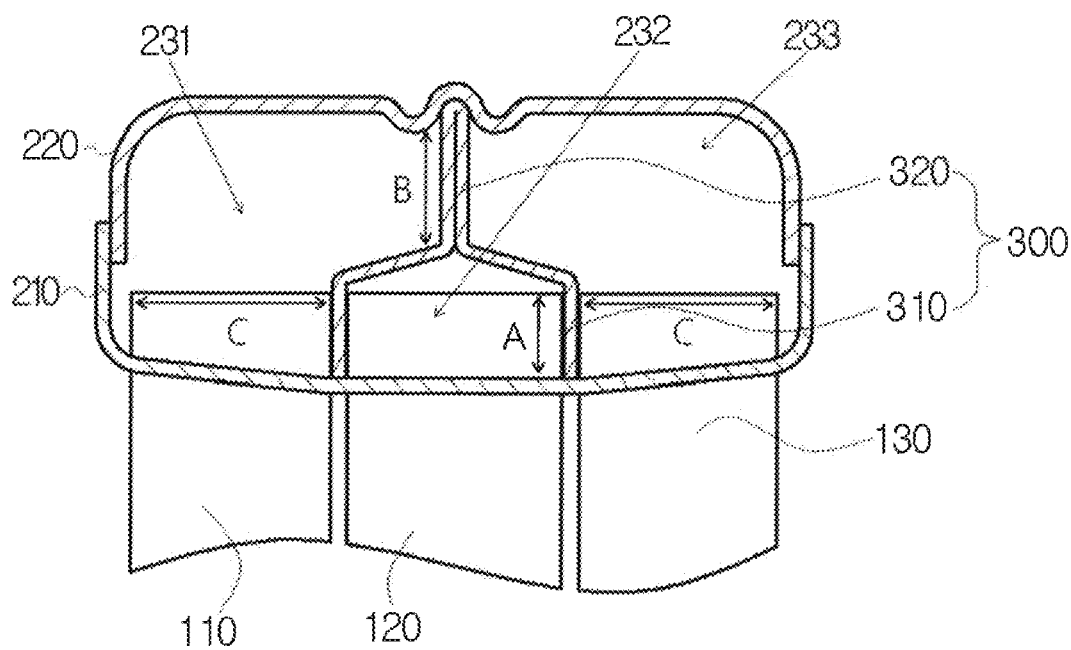
FIG. 13 is a cross-sectional view of the cold reserving heat exchanger according to the present invention.

FIG. 13 is a cross-sectional view of an upper header tank according to the present invention. The second-row tube 120 is inserted into the header 210 by a predetermined length, and the two header-side partition wall portions 310 are bent at an end portion of the second-row tube 120 and meet one end of the tank-side partition wall portion 320 having a predetermined length from the tank 220 toward the header 210.

As illustrated in FIG. 13, the first space portion 231 and the third space portion 233 are spaces that are in 130, respectively, and have the cooling fluid moving therein.

In the case in which the cold reserving heat exchanger serves as an evaporator, in order to improve heat radiation performance of the cold reserving heat exchanger, an amount of the cooling fluid, may be increased and a heat transfer area may be increased so that heat exchange from the cooling fluid to air or the cold reserving material is performed well. To this end, sizes of the first space portion 231 and the third, space portion 233 may be increased.

The second space portion 232 is a space that is in communication with the second-row tube 120 and has the cold reserving material stored therein. In order to improve cold reserving performance of the cold reserving heat exchanger, an amount of the cold reserving material stored in the second space portion 232 and the second-row tube 120 may be increased. To this end, a size of the second space portion 232 may be increased.

A mounted space of the cold reserving heat exchanger is limited, and particularly, spaces of the upper header tank 201 and the lower header tank 202 are also limited. Therefore, there is a limitation in uniformly increasing the sizes of the first to the third space portions 211 to 233 of the header tank in order to improve the heat radiation performance and the cold reserving performance of the cold reserving heat exchanger, and the sizes of the first to the third space portions 211 to 233 may thus be optimized so as to simultaneously maximize the heat radiation performance and the cold reserving performance.

The sizes of the first space portion 231, the second space portion 232, and the third space portion 233 may be represented by cross-sectional areas perpendicular to the width direction, as illustrated in FIG. 13, and the cross-sectional areas may be determined by a tube insertion length A by which the second-row tube 120 is inserted into the header 210, a length B of the tank-side partition wall portion 320, and widths C of the first-row tube 110 and the third-row tube 130.

Here, the first-row tube 110 and the third-row tube 130 may be inserted into the header 210, as in the second-row tube 120. In addition, the first-row tube 110 and the third-row tube 130 may have the same shape.

Figure 14:
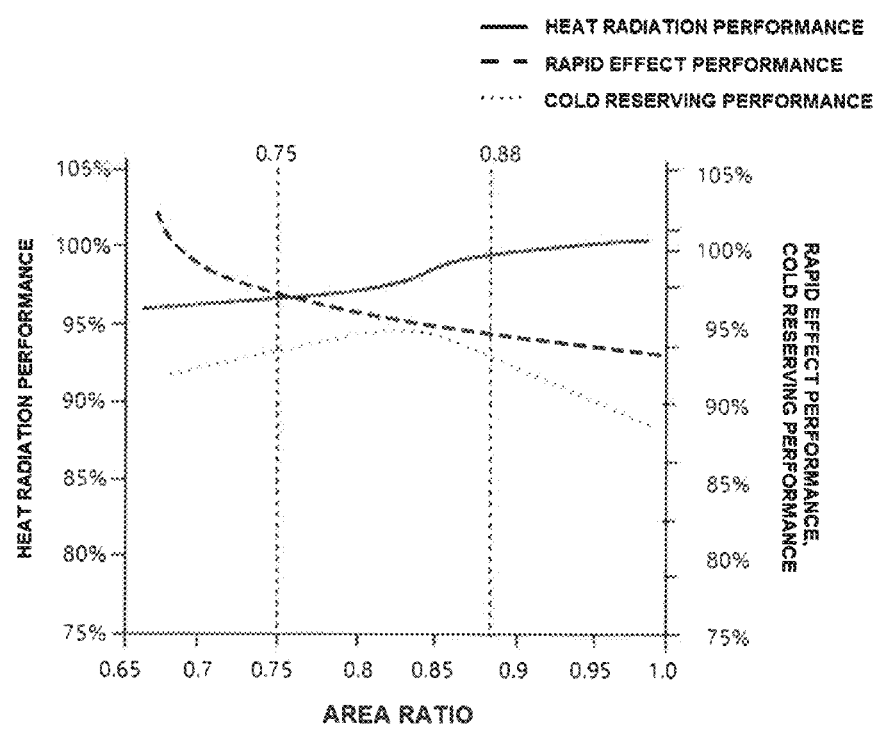
FIG. 14 is graphs illustrating heat radiation performance, rapid effect performance, and cold reversing performance depending on an area ratio.

FIG. 14 is graphs illustrating heat radiation performance, rapid effect performance, and cola reversing performance of the cold reserving heat exchanger depending on a ratio (hereinafter, referred to as an 'area ratio') of cross-sectional areas of the first to the third space portions 211 to 233 to cross-sectional areas of all of the first to the third space portions 211 to 233. The ratio may be considered as a ratio between the cooling fluid and the cold reserving material in the cold reserving heat exchanger.

As illustrated in FIG. 14, it may be confirmed that as the area ratio becomes large, the heat radiation performance becomes high. The reason is that as the area ratio becomes large, the sizes of the first-row tube 110 and the third-row tube 130 in which the cooling fluid is circulated become large and a heat exchange area between the cooling fluid and external air is increased.

Meanwhile, the rapid effect performance may be represented by a time required for a temperature of the cold reserving material to be lowered from room temperature to a predetermined temperature, and in FIG. 14, the rapid effect performance is represented by a ratio of the time required for the temperature of the cold reserving material to be lowered to the predetermined temperature. As illustrated in FIG. 14, it may be confirmed that as the area ratio becomes large, the time for the temperature of the cold reserving material to be lowered to the predetermined temperature is reduced, such that the rapid effect performance becomes high. The reason is that as the area ratio becomes large, an amount of the cooling fluid is increased and the heat radiation performance becomes high.

Meanwhile, the cold reversing performance may be represented by a duration in which air passing through the cold reserving heat exchanger may be cooled using cold air stored in the cold reserving material rather than the cooling fluid, and in FIG. 14, the cold reversing performance is represented by a ratio of the duration in which the air may be cooled. As illustrated in FIG. 14, it may be confirmed that as the area ratio becomes large, the duration in which the cold reserving material may cool the air is increased, such that the cold reversing performance becomes high, and when the area ratio exceeds 0.83, the cold reserving performance is decreased. The reason is that as the area ratio becomes large, an amount of the cold reserving material is decreased.

In summary, as illustrated in FIG. 14, it is preferable that the area ratio is 0.75 to 0.88 so that the rapid effect performance and the cold reversing performance as well as the heat radiation performance of the cold reserving heat exchanger may approach maximum values. In the case in which the area ratio is less than 0.75, the sizes of the first-row tube 110 and the third-row tube 130 in which the cooling fluid of the cold reserving heat exchanger is circulated are small and the heat exchange area becomes small, such that the heat radiation performance is low. Therefore, the cold reserving material may not be sufficiently cooled, such that the cola reversing performance and the rapid effect performance become significantly low and entire performance of the cold reserving heat exchanger thus becomes low. In addition, in the case in which the area ratio exceeds 0.88, the size of the second-row tube 120 in which the cold reserving material is stored becomes small, and an amount of the stored cold reserving material is small, such that the cold reversing performance become significantly low. Therefore, in the case in which the area ratio is 0.75 to 0.88, the cold reserving heat exchanger of which all of the heat radiation performance, the rapid effect performance, and the cold reversing performance are excellent may be stably provided.

In an experiment example of the present invention, a width of the upper header tank 201 is 45.4 mm, and a height of the upper header tank 201 is 15.7 mm. In the case in which the area ratio is 0.75, the tube insertion length A by which the second-row tube 120 is inserted into the header 210 is 8 mm, the length B of the tank-side partition wall portion 320 is 7 mm, and each of the widths C of the first-row tube 110 and the third-row tube 130 is 11.5 mm. In addition, in the case in which the area ratio is 0.88, the tube insertion length A by which the second-row tube 120 is inserted into the header 210 is 6 mm, the length B of the tank-side partition wall portion 320 is 9 mm, and each of the widths C of the first-row tube 110 and the third-row tube 130 is 15 mm. Therefore, it is preferable that a ratio of the tube insertion length A to a height of the header tank 200 is 0.38 to 0.51, a ratio of the length B of the tank-side partition wall portion 320 to the height of the header tank 200 is 0.45 to 0.57, and a ratio of each of the widths C of the first-row tube 110 and the third-row tube 130 to a width of the header tank 200 is 0.25 to 0.33 so that the area ratio corresponds to 0.75 to 0.88.

As described above, the areas of first to third space portions in the header tank of the cold, reserving heat exchanger are optimized, there making it possible to stably provide the cold reserving heat exchanger of which both of the heat radiation performance and the cold reserving performance may be improved.

Meanwhile, hereinafter, a cold reserving heat exchanger according to still another exemplary embodiment of the present invention will be described.

In order to improve both of heat radiation performance and cold reserving performance of the cold reserving heat exchanger, sizes or cross-sectional areas of the first-row tube 110 and the third-row tube 130 may be increased, thereby improving the heat radiation performance, and an internal space of the second-row tube 120 having a limited size may be increased in order to increase an amount of the cold reserving material stored in the second-row tube, thereby improving the cold reserving performance.

Figure 15:
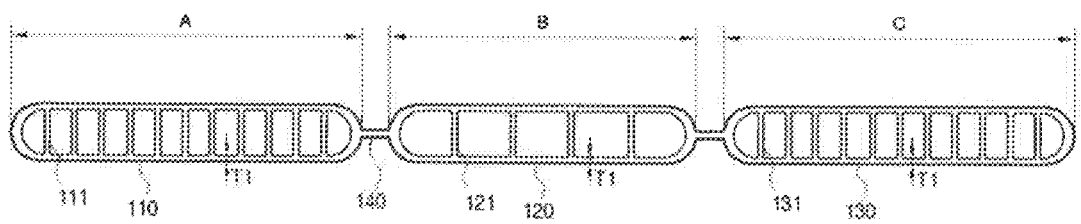
FIG. 15 is a cross-sectional view of the tubes of the cold reserving heat exchanger according to the present invention taken along line B-B of FIG. 3.

To this end, referring to cross sections of tubes of FIG. 15 taken along line B-B of FIG. 3, a width of each of the first-row tube 110 and the third-row tube 130 may be larger than that of the second-row tube 120. In order to secure sufficient neat radiation performance in a limited range, each of the first-row tube 110 and the third-row tube 130 is formed at a width larger than that of the second-row tube 120 in charge of the cold reserving performance, thereby making it possible to increase a heat transfer area.

In addition, the first-row tube 110 and the third-row tube 130 may include one or more tube partition walls 111 and 131 formed in the length direction, respectively. When the numbers of tube partition walls 111 and 131 are increased, the numbers of tube holes in the tubes are also increased, which makes a hydraulic diameter with the cooling fluid in the tubes small and makes a heat transfer area large, thereby making it possible to improve the heat radiation performance of the cold reserving heat exchanger.

Although widths of the first-row tube 110 and the third-row tube 130 may be different from each other, the first-row tube 110 and the third-row tube 130 may be formed in the same shape for convenience of manufacturing.

In the case in which the first-row tube 110 has a width of about 14.8 mm, it is preferable that the number of tube partition walls 111 in the first-row tube 110 is about 11. This may be similarly applied to the third-row tube 130.

Meanwhile, it is preferable that tube partition walls 121 do not exist in the second-row tube 120 in order to store as much cold reserving material as possible in the second-row tube 120. Since the tube partition walls 121 do not exist, the cold reserving material may be further stored, and the tube partition walls that are not necessary are removed to reduce a weight of the cold reserving heat, exchanger. When the number of tube partition walls 121 of the second-row tube 120 is reduced to a half of that of tube partition walls of the first-row tube 110, the cold reserving material may be further injected by 9.1% as compared with the existing case.

However, when the tube partition walls 121 do not exist in the second-row tube 120, a component supporting an external wall of the second-row tube 120 in a process of producing the second-row tube 120, particularly, a process of extruding the second-row tube 120 does not exist, such that the second-row tube 120 may not be properly extruded. Therefore, it is preferable that the number of tube partition, walls 121 in the second-row tube 120 is 4 or less.

In addition, each of the number of tube partition walls 111 in the first-row tube 110 and the number of tube partition walls 131 in the third-row tube 130 may be the same as or larger than that of tube partition walls in the second-row tube 120.

In addition, each of a thickness T1 of an external wall of the first-row tube 110 and a thickness T3 of an external wall of the third-row tube 130 may be the same as or larger than a thickness T2 of the external wall of the second-row tube 120.

Therefore, since the thickness of the external wall of the second-row tube 120 becomes relatively thin, the cold reserving material may be further stored in the second-row tube 120, and a weight of the cold reserving heat exchanger may be reduced. Since the first-row tube 110 and the third-row tube 130 need to be thick enough to endure a pressure of the cooling fluid, it is preferable that each of the thicknesses of the external walls of the first-row tube 110 and the third-row tube 130 is larger than that of the external wall of the second-row tube 120.

Meanwhile, each of a hydraulic diameter of the first-row tube 110 and a hydraulic diameter of the third-row tube 130 may be smaller than that of the second-row tube 120. Therefore, sufficient heat radiation performance of the cold reserving heat exchanger may be maintained.

A hydraulic diameter of a tube is calculated as follows.

Hydraulic Diameter of Tube=4×Channel Area/Wetted Perimeter

Here, the channel area means a cross-sectional, area of a tube hole in the tube, and the wetted perimeter is the same as a length of a circumference of the tube hole.

Figure 16:
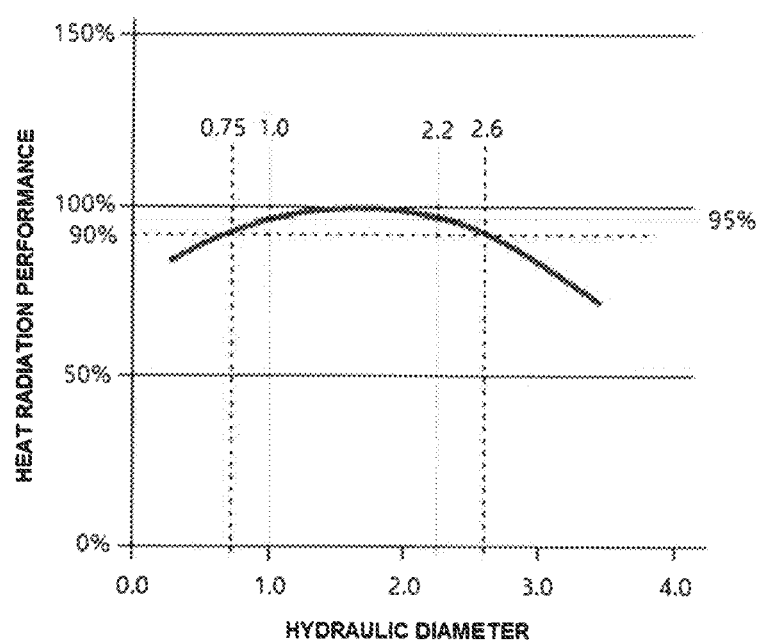
FIG. 16 is a graph illustrating heat radiation performance depending on hydraulic diameters of tubes.

FIG. 16 is a graph illustrating heat radiation performance depending on hydraulic diameters of tubes. As illustrated in FIG. 16, the hydraulic diameters of the first-row tube 110 and the third-row tube 130 in which the cooling fluid flows have a significant influence on the heat radiation performance of the cold reserving heat exchanger. Data illustrated in FIG. 16 are obtained by measuring the heat radiation performance of the cold reserving heat exchange while changing the hydraulic diameter of the first-row tube 110 and the hydraulic diameter of the third-row tube 130 in a condition in which a shape of the second-row tube is constantly maintained and shapes of the first-row tube 110 and the third-row tube 130 are made to be the same as each other.

In FIG. 16, in the case in which each of the hydraulic diameters of the first-row tube 110 and the third-row tube 130 is 1.38 mm, the heat radiation performance is maximum.

As illustrated in FIG. 16, it is preferable that each of the hydraulic diameter of the first-row tube 110 and the hydraulic diameter of the third-row tube 130 of the cold reserving heat exchanger according to the present invention is 0.75 mm to 2.6 mm so as to obtain heat radiation performance corresponding to 90% or more of maximum heat radiation performance of the cold reserving heat exchanger. In the case in which each of the hydraulic diameters is less than 0.75 mm or exceeds 2.6 mm, the heat radiation performance of the cold reserving heat exchanger is less than 90% of the maximum heat radiation performance, such that the cold reserving heat exchanger may not sufficiently lower an internal temperature of a vehicle. In the case in which each of the hydraulic diameters is 0.75 mm to 2.6 mm, the heat radiation performance of the cold reserving heat exchanger is 90% or more of the maximum heat radiation performance, such that the cold reserving neat exchanger may sufficiently lower the internal temperature of the vehicle, and the numbers of tube partition walls are adjusted to change the hydraulic diameters, thereby making it possible to make optimization between a pressure resistance property of the tubes and a material cost of the cold reserving heat exchanger.

In addition, as illustrated in FIG. 16, it is more preferable that each of the hydraulic diameter of the first-row tube 110 and the hydraulic diameter of the third-row tube 130 of the cold reserving heat exchanger according to the present invention is 1.0 mm to 2.2 mm so as to obtain heat radiation performance corresponding to 95% or more of the maximum heat radiation performance of the cold reserving heat exchanger. In the case in which each of the hydraulic diameters is 1.0 mm to 2.2 mm, the heat radiation performance is 95% or more of the maximum heat radiation performance, which does not substantially have a difference from the maximum heat radiation performance. Therefore, the cold reserving heat exchanger may sufficiently lower the internal temperature of the vehicle, and a vehicle user is hard to feel the difference.

That is, in the present invention, each of the hydraulic diameter of the first-row tube 110 and the hydraulic diameter of the third-row tube 130 is set to 0.75 mm to 2.6 mm, thereby making it possible to stably provide the cold reserving heat exchanger having the heat radiation performance corresponding to 90% or more of the maximum heat radiation performance. In addition, more preferable, each, of the hydraulic diameter of the first-row tube 110 and the hydraulic diameter of the third-row tube 130 is set to 1.0 mm to 2.2 mm, thereby making it possible to stably provide the cold, reserving heat exchanger having the heat radiation performance corresponding to 95% or more of the maximum heat radiation performance.

Meanwhile, as illustrated in FIG. 15, the first-row tube 110, the second-row tube 120, and the third-row tube 130 may be formed to be connected to each other. That is, the cold reserving heat exchanger according to the present invention may further include a first connecting portion 140 connecting the first-row tube 110 and the second-row tube 120 disposed on the same line to each other; and a second connecting portion 150 connecting the second-row tube 120 and the third-row tube 130 disposed, on the same line to each other.

The first-row tube 110, the second-row tube 120, and the third-row tube 130 may be simultaneously extruded and be formed integrally with each other. When the first-row tube 110, the second-row tube 120, and the third-row tube 130 are simultaneously extruded and formed integrally with each other, an assembling process and an assembling time may be reduced.

The first-row tube 110, the second-row tube 120, and the third-row tube 130 may be separately extruded and formed. When the first-row tube 110, the second-row tube 120, and the third-row tube 130 are separately extruded, and are connected to each other by brazing or welding, an assembling process and an assembling time may be further added, but an extruding process becomes simple, such that a defect may be reduced.

Therefore, in the cold reserving heat exchanger according to an exemplary embodiment of the present invention, the cold reserving material is stored in the tube positioned at the center to effectively store cold air of a refrigerant and discharge the cold, air at the time of stopping an engine to thus prevent a rapid rise in an internal temperature of a vehicle and constantly maintain internal air, thereby making it possible to improve cooling comfortableness of a user and minimize energy and a time consumed at the time of again performing cooling.

In addition, in the present invention, the partition wall portion surrounding the second-row tube in which the cold reserving material is stored, separating the first-row tube, the third-row tube, and the space, and having the communication holes formed therein so that the cooling fluid of the first-row tube and the third-row tube is circulated may be included in the upper and lower header tanks to prevent the cold reserving material and the cooling fluid from being mixed with each other and remove an area unnecessarily occupied for separating the space, thereby making it possible to minimize the width of the entire core of the cold reserving heat exchanger.

Further, in the present invention, the partition wall portion allows a moving space of the cooling fluid moving to the first-row tube and the third-row tube in the upper and lower header tanks to be maximally secured while separating a space of the second-row tube, thereby making it possible to minimize moving resistance, and a separate additional structure for moving the cooling fluid between the first-row tube and the third-row tube does not need to be installed, such that a manufacturing cost may be reduced.

Further, in the present invention, the cold reserving material is positioned at the center, thereby making it possible to improve rapid effect performance at the time of initially operating an air conditioner, and an amount of injected, cold reserving material is increased as compared with a plate type cold reserving evaporator, thereby making it possible to improve cold reserving performance.

Meanwhile, in the cold reserving heat exchanger according to another exemplary embodiment of the present invention, the cold reserving material is stored in the tube positioned at the center to effectively store cold air of a refrigerant and discharge the cola air at the time of stopping an engine to thus prevent a rapid rise in an internal temperature of a vehicle and constantly maintain internal air, thereby making it possible to improve cooling comfortableness of a user and minimize energy and a time consumed at the time of again performing cooling.

In addition, the areas of first to third space portions in the header tank of the cold reserving heat exchanger are optimized, there making it possible to stably provide the cold reserving heat exchanger of which both of the neat radiation performance and the cold reserving performance may be improved.

Further, in the cold reserving heat exchanger according to still another exemplary embodiment of the present invention, in order to secure sufficient heat radiation performance in a limited range, each of the first-row tube and the third-row tube is formed at a width larger than that of the second-row tube in charge of the cold reserving performance, thereby making it possible to increase a heat transfer area.

Further, in the present invention, the hydraulic diameter of the first-row tube and the hydraulic diameter of the third-row tube are optimized, thereby making it possible to stably provide the cold reserving heat exchanger having the heat radiation performance corresponding to 90% or more of the maximum, heat radiation performance.

Further, in the present invention, the tube partition, walls in the second-row tube are removed, the number of tube partition walls in the second-row tube is minimized, or the thickness of the external wall of the second-row tube is relatively reduced, thereby making it possible to store a larger amount of cold reserving material while maintaining the heat radiation performance, and the tube partition walls that are unnecessary disappear, thereby making it possible to reduce a weight of the cold reserving heat exchanger.

The present invention is not limited to the abovementioned exemplary embodiments, but may be variously applied. In addition, the present invention may be variously modified by those skilled in the art to which the present invention pertains without departing from the spirit and scope of the present invention claimed in the claims.

What is claimed is:

1. A cold reserving heat exchanger comprising:
   a plurality of tubes disposed in three rows in a width direction and including a first-row tube and a third-row tube in which a cooling fluid is circulated and a second-row tube in which a cold reserving material is stored;
   an upper header tank and a lower header tank fixed to both ends of the tubes in a length direction, including a first space portion that is in communication with the first-row tube, a second space portion that is in communication with the second-row tube, and a third space portion that is in communication with the third-row tube, corresponding to three spaces separated in the width direction, and having a header and a tank coupled to each other;
   a partition wall portion provided in each of the upper header tank and the lower header tank to separate a space and including two header-side partition wall portions surrounding the second-row tube and extended toward the tank and a tank-side partition wall portion extended from a predetermined point at which the header-side partition wall portions meet each other in the same direction and having the other end fixed to any one point of the tank; and
   an inlet formed in the first space portion or the third space portion and having the cooling fluid introduced therethrough and an outlet formed in the first space portion or the third space portion and having the cooling fluid discharged therethrough.

2. The cold reserving heat exchanger of claim 1, wherein the header-side partition wall portions have one ends each fixed between a second-row tube insertion hole and a first-row tube insertion hole of the header and between the second-row tube insertion hole and a third-row tube insertion hole of the header.

3. The cold reserving heat exchanger of claim 2, wherein the cold reserving heat exchanger is formed so that intervals between the first-row to third-row tube insertion holes and thicknesses of the header-side partition wall portions are the same as each other.

4. The cold reserving heat exchanger of claim 1, wherein the partition wall portion includes communication holes formed by hollowing predetermined regions on the tank-side partition wall portion so that the cooling fluid moves between the first space portion and the third space portion.

5. The cold reserving heat exchanger of claim 4, wherein the communication holes are formed in at least any one place of the partition wall portion provided in the upper header tank or the lower header tank.

6. The cold reserving heat exchanger of claim 4, wherein a plurality of communication holes are formed to be spaced apart from each other by a predetermined interval in the length direction of the partition wall portion.

7. The cold reserving heat exchanger of claim 1, wherein the partition wall portion includes a plurality of header coupling protrusions formed at one end portions of the header-side partition wall portions, protruding toward the header, and spaced apart from each other by a predetermined interval in the length direction.

8. The cold reserving heat exchanger of claim 1, wherein the upper header tank and the lower header tank include first seating grooves formed by concaving an inner side surface of the header so that end portions of the header-side partition wall portions are seated at predetermined positions.

9. The cold reserving heat exchanger of claim 1, wherein the upper header tank and the lower header tank include a second seating groove formed by concaving an inner side surface of the tank so that an end portion of the tank-side partition wall portion is seated at a predetermined position.

10. The cold reserving heat exchanger of claim 1, wherein the two header-side partition wall portions of the partition wall portion are bent at an end portion of the second-row tube, and are linearly extended toward any one point at which the tank-side partition wall portion is formed, while having a predetermined gradient.

11. The cold reserving heat exchanger of claim 1, wherein the two header-side partition wall portions of the partition wall portion are curved in a round, shape at an end portion of the second-row tube, and are linearly extended toward any one point at which the tank-side partition wall portion is formed.

12. The cold reserving heat exchanger of claim 1, wherein the two header-side partition wall portions of the partition wall portion are bent at an end portion of the second-row tube, and are extended, in a horizontal direction, toward any one point at which the tank-side partition wall portion is formed.

13. The cola reserving heat exchanger of claim 1, further comprising baffles disposed in the first space portion and the third space portion in order to adjust movement of the cooling fluid.

14. The cold reserving heat exchanger of claim 1, wherein the second-row tube is inserted into the header by a predetermined length, and
   the two header-side partition wall portions are bent at an end portion of the second-row tube and meet one end of the tank-side partition wall portion having a predetermined length from the tank toward the header.

15. The cold reserving heat exchanger of claim 1, wherein areas of the first space portion, the second space portion, and the third space portion are determined by a tube insertion length by which the second-row tube is inserted into the header, a length of the tank-side partition wall portion, and widths of the first-row tube and the third-row tube.

16. The cold reserving heat exchanger of claim 1, wherein widths of the first-row tube and the third-row tube are larger than that of the second-row tube, and the first-row tube and the third-row tube include one or more tube partition walls formed in the length direction, respectively.

17. The cold reserving heat exchanger of claim 16, wherein the number of tube partition walls in the second-row tube is 4 or less.

18. The cold reserving heat exchanger of claim 16, wherein each of a hydraulic diameter of the first-row tube and a hydraulic diameter of the third-row tube is smaller than that of the second-row tube.

19. The cold reserving heat exchanger of claim 16, wherein catch of a thickness of an external wall of the first-row tube and a thickness of an external wall of the third-row tube is the same as or larger than a thickness of an external wall of the second-row tube.

20. The cold reserving heat exchanger of claim 16, further comprising:

a first connecting portion connecting the first-row tube and the second-row tube disposed on the same line to each other; and a second connecting portion connecting the second-row tube and the third-row tube disposed on the same line to each other.

* * * * *